United States Patent
Yamamoto et al.

(10) Patent No.: US 12,422,738 B2
(45) Date of Patent: Sep. 23, 2025

(54) PROJECTION APPARATUS

(71) Applicant: FUJIFILM Corporation, Tokyo (JP)

(72) Inventors: Chikara Yamamoto, Saitama (JP); Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 406 days.

(21) Appl. No.: 18/183,885

(22) Filed: Mar. 14, 2023

(65) Prior Publication Data

US 2023/0213845 A1 Jul. 6, 2023

Related U.S. Application Data

(63) Continuation of application No. PCT/JP2021/030940, filed on Aug. 24, 2021.

(30) Foreign Application Priority Data

Sep. 25, 2020 (JP) .................................. 2020-161154

(51) Int. Cl.
*G03B 21/14* (2006.01)
*G03B 21/53* (2006.01)

(52) U.S. Cl.
CPC ........... *G03B 21/142* (2013.01); *G03B 21/53* (2013.01)

(58) Field of Classification Search
CPC .................. G03B 21/00–64; H04N 9/31–3197
See application file for complete search history.

(56) References Cited

U.S. PATENT DOCUMENTS

| | | | |
|---|---|---|---|
| 2010/0103385 A1* | 4/2010 | Kubota | ................ H04N 9/3194 353/121 |
| 2017/0068153 A1 | 3/2017 | Ikeura et al. | |
| 2018/0217351 A1* | 8/2018 | Shiraishi | ................ G02B 7/021 |
| 2019/0037186 A1* | 1/2019 | Yoshimura | ....... H04N 21/42204 |

(Continued)

FOREIGN PATENT DOCUMENTS

| | | | |
|---|---|---|---|
| JP | 2009-229807 A | 10/2009 | |
| JP | 2015-215378 A | 12/2015 | |

(Continued)

OTHER PUBLICATIONS

International Search Report issued in PCT/JP2021/030940; mailed Nov. 9, 2021.

(Continued)

*Primary Examiner* — Christopher A Lamb, II
(74) *Attorney, Agent, or Firm* — Studebaker Brackett PLLC

(57) ABSTRACT

A projection apparatus includes a display element that displays an image, a projection optical system that forms a projection image by projecting the image, an imaging unit that includes an imaging optical system which images a first region including an optical axis of the projection optical system in the projection image, and an imaging element which captures an image formed by the imaging optical system, and a processor that controls focus adjustment on a second region not including the optical axis in the projection image based on information acquired from the imaging unit, in which a position of the projection image is changeable by changing a relative position between at least a part of the projection optical system and the display element, and a predetermined conditional expression is satisfied.

7 Claims, 12 Drawing Sheets

(56) References Cited

U.S. PATENT DOCUMENTS

2020/0225567 A1 7/2020 Kano
2021/0247674 A1 8/2021 Shimizu et al.

FOREIGN PATENT DOCUMENTS

| JP | 2017-187572 A | 10/2017 |
| JP | 2020-008804 A | 1/2020 |
| JP | 2020-112660 A | 7/2020 |
| WO | 2020/100507 A1 | 5/2020 |

OTHER PUBLICATIONS

International Preliminary Report on Patentability (Chapter I) and Written Opinion of the International Searching Authority issued in PCT/JP2021/030940; issued Mar. 28, 2023.

* cited by examiner

PROJECTION APPARATUS

CROSS-REFERENCE TO RELATED APPLICATIONS

This application is a continuation application of International Application No. PCT/JP2021/030940, filed on Aug. 24, 2021, which claims priority from Japanese Patent Application No. 2020-161154, filed on Sep. 25, 2020. The entire disclosure of each of the above applications is incorporated herein by reference.

BACKGROUND

Technical Field

The disclosed technology relates to a projection apparatus.

Related Art

In the related art, various technologies related to autofocus of a projection image of a projection apparatus have been suggested. For example, JP2017-187572A discloses an image projection apparatus that can project an image to a surface of a curved shape to which projection is performed, and that includes a first focus adjustment part which performs focus adjustment on a first region including an optical axis position of a projection optical system, a second focus adjustment part which performs focus adjustment on a second region present closer to an edge part side than the first region, an image generation part which can generate a chart for focus adjustment, and a control part which controls driving of the first and second focus adjustment parts.

SUMMARY

One embodiment according to the disclosed technology provides a projection apparatus that enables autofocus for a projection image projected to a wide range at a low cost without an increase in size of the apparatus.

A projection apparatus according to an aspect of the present disclosure comprises a display element that displays an image, a projection optical system that forms a projection image by projecting the image, an imaging unit that includes an imaging optical system which images a first region including an optical axis of the projection optical system in the projection image, and an imaging element which captures an image formed by the imaging optical system, and a processor that controls focus adjustment on a second region not including the optical axis in the projection image based on information acquired from the imaging unit, in which a position of the projection image is changeable by changing a relative position between at least a part of the projection optical system and the display element, and in a case where a longest diameter of a display region in the display element is H1, a focal length of the projection optical system is f1, a longest diameter of an imaging region in the imaging element is H2, a maximum half angle of view of the projection optical system is θ1, and a focal length of the imaging optical system is f2, Conditional Expressions (1) and (2) below are satisfied.

$$2.2 < H1/|f1| \tag{1}$$

$$0 < |H2/(f2 \times \tan \theta 1)| < 1.2 \tag{2}$$

It is preferable that the projection apparatus according to the aspect of the present disclosure satisfies at least one of Conditional Expression (1-1) or (2-1) below.

$$3 < H1/|f1| < 8 \tag{1-1}$$

$$0 < |H2/(f2 \times \tan \theta 1)| < 0.8 \tag{2-1}$$

It is preferable that in a case where both of the projection image and the first region have rectangular shapes, a long side direction of the projection image is parallel to a short side direction of the first region.

The projection image may be an image for measuring a projection distance of the projection image.

In the projection optical system, the focus adjustment may be possible on a third region that is an entire projection image. In this case, it is preferable that a movable part in the focus adjustment of the second region is different from a movable part in the focus adjustment of the third region.

The projection optical system may include at least one optical path deflection member that deflects an optical path, a part of the projection optical system may be rotatable about the optical axis of the projection optical system, and the imaging unit may be arranged closer to an enlargement side than the optical path deflection member that is closest to the enlargement side.

DESCRIPTION OF EMBODIMENTS

Hereinafter, an example of an embodiment of the disclosed technology will be described with reference to the drawings.

In the description of the present specification, "parallel" or "perpendicular" refers to not only being completely parallel or completely perpendicular but also being approximately parallel or approximately perpendicular including errors generally permitted in the technical field to which the disclosed technology belongs.

Figure 1:
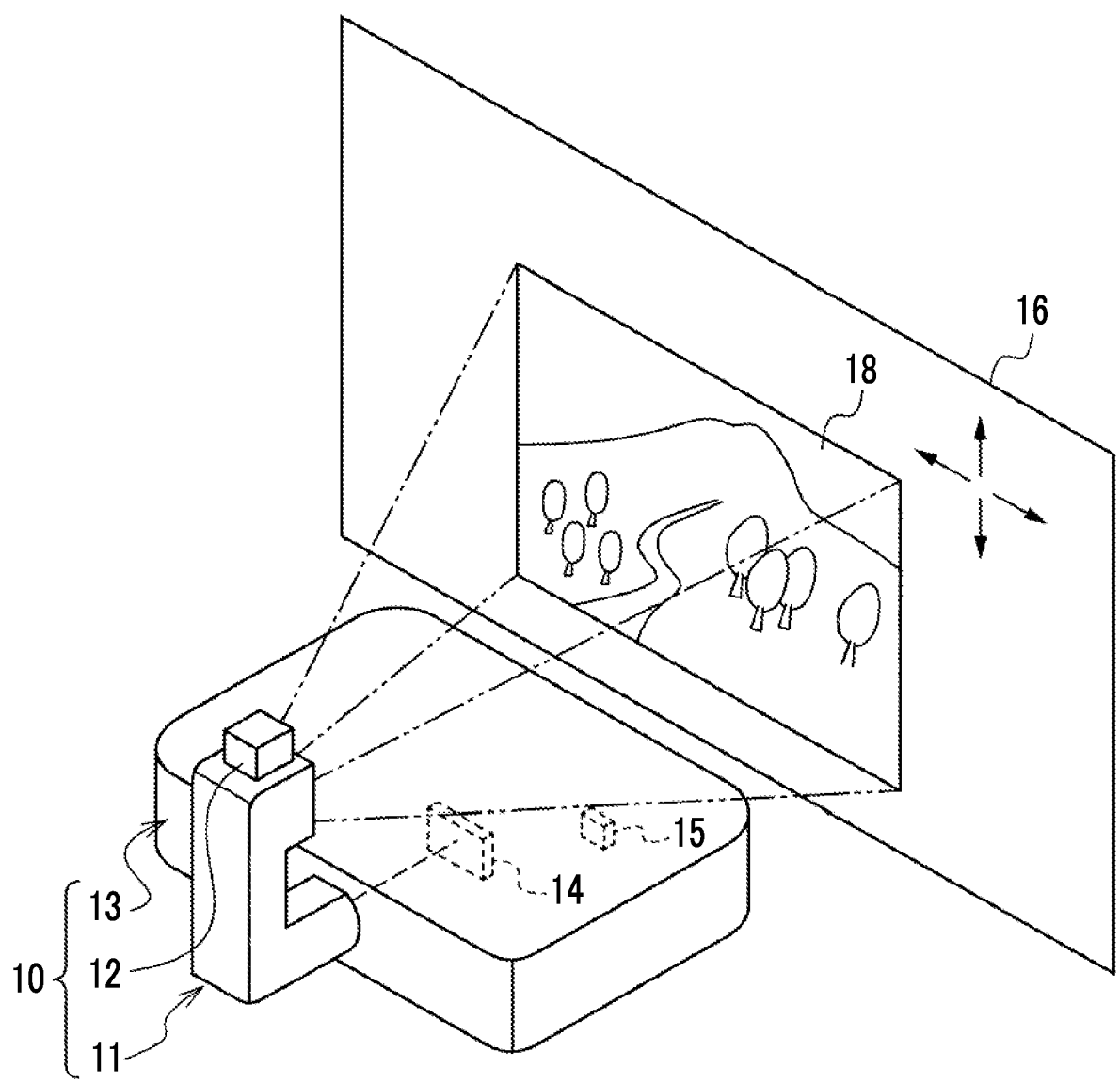
FIG. 1 is a diagram schematically illustrating a usage state of a projection apparatus.

FIG. 1 illustrates a usage state of a projection apparatus 10 according to one embodiment of the disclosed technology. The projection apparatus 10 comprises a projection unit 11, an imaging unit 12, and a body part 13. A display element 14 and a light source unit 15 are comprised inside the body part 13. In FIG. 1, the display element 14 and the light source unit 15 are conceptually illustrated. The display element 14 displays an image. The projection unit 11 projects an enlarged image of the image displayed by the display element 14 to a screen 16 as a projection image 18. The imaging unit 12 images a region near an optical axis of a projection optical system 1 in the projection image 18.

The screen 16 means an object to which the projection image 18 is projected. The screen 16 may be not only a dedicated screen but also a wall surface, a floor surface, a ceiling, and the like of a room. In addition, in a case of using the projection apparatus 10 in an outdoor space, the screen 16 also includes an outer wall and the like of a building.

Figure 2:
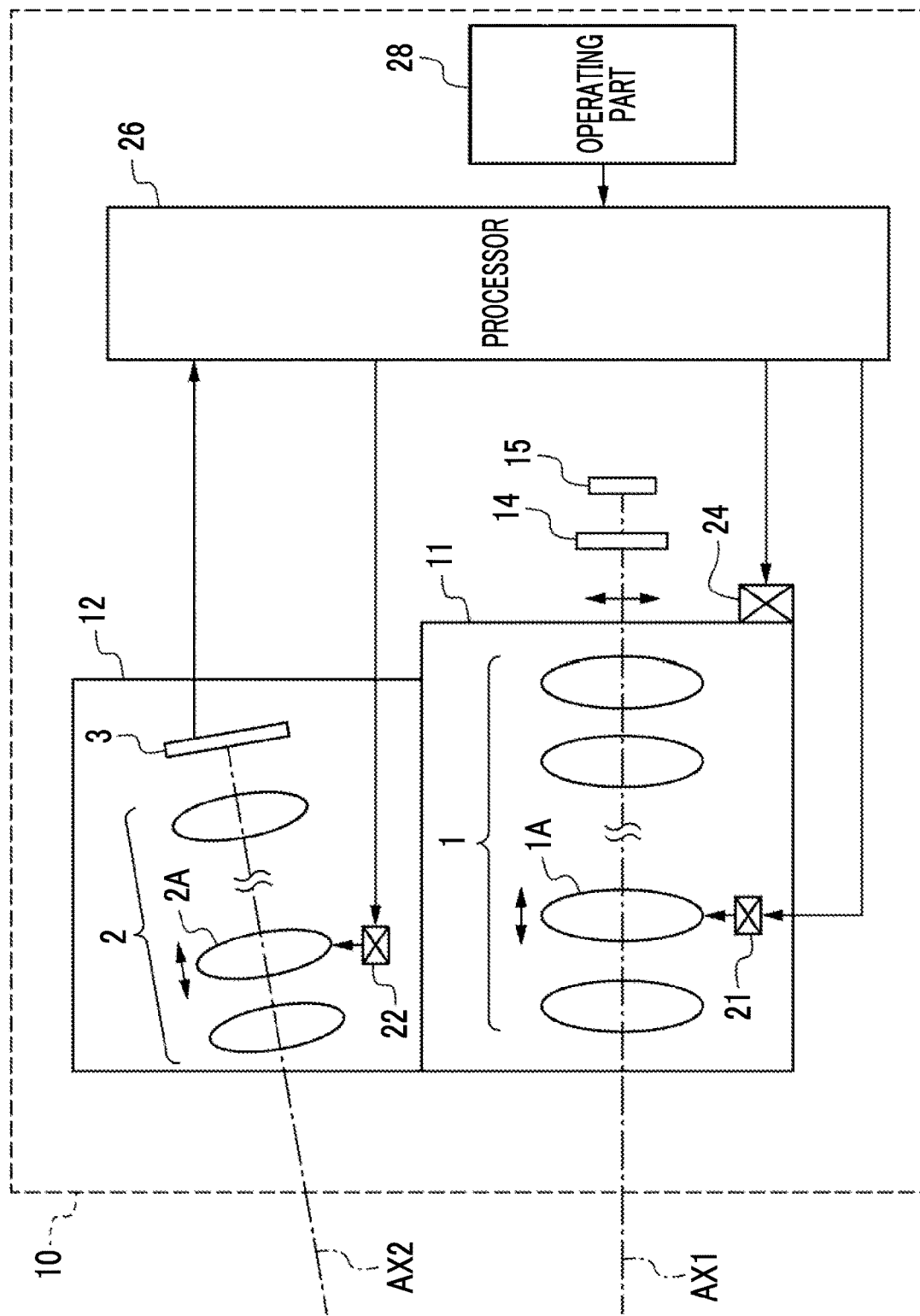
FIG. 2 is a schematic configuration diagram of the projection apparatus according to one embodiment.

FIG. 2 schematically illustrates a schematic configuration diagram of the projection apparatus 10. In addition to the above configuration, the projection apparatus 10 comprises a projection focus mechanism 21, an imaging focus mechanism 22, a lens shift mechanism 24, a processor 26, and an operating part 28.

As an example, the light source unit 15 can be configured as follows. The light source unit 15 includes a lamp, a rotating color filter, and an illumination optical system. The lamp emits white light. Filters of three colors of blue, green, and red are provided on a circumference of the rotating color filter. In a case where the rotating color filter rotates, the filters of each color are selectively inserted on an optical path of the white light emitted by the lamp. Accordingly, the white light is selectively converted to each color light of blue light, green light, and red light in a time division manner. The illumination optical system acts on the light emitted from the rotating color filter to increase uniformity of a light quantity distribution in a cross section perpendicular to the optical axis, and guides the light to the display element 14.

For example, a digital micromirror device (DMD; registered trademark) can be used as the display element 14. The DMD is an image display element including a plurality of micromirrors capable of changing a reflection direction of the light of irradiation from the light source unit 15, in which each micromirror is two-dimensionally arranged in units of pixels. The DMD performs optical modulation corresponding to the image by changing a direction of each micromirror in accordance with the image to switch ON and OFF reflected light of the light from the light source unit 15.

The projection unit 11 includes the projection optical system 1 and the projection focus mechanism 21. The projection optical system 1 consists of a plurality of optical elements. The projection optical system 1 of the present example includes a plurality of lenses arranged along an optical axis AX1 of the projection optical system 1. FIG. 2 conceptually illustrates the plurality of lenses included in the projection optical system 1. The projection optical system 1 forms the projection image 18 by projecting the image displayed by the display element 14 to the screen 16.

Apart of the plurality of lenses included in the projection optical system 1 functions as a focus group 1A. The focus group 1A is a movable part in performing focus adjustment on a region not including the optical axis AX1 in the projection image 18. The projection focus mechanism 21 is electrically connected to the processor 26 and moves the focus group 1A along the optical axis AX1 based on a driving signal from the processor 26. Accordingly, the focus adjustment is performed on the region. For example, the projection focus mechanism 21 is configured to include an actuator (not illustrated) such as a motor.

The imaging unit 12 is used for measuring a projection distance of the projection image 18. The "projection distance" is a distance from an optical element closest to a screen 16 side on an optical path of the projection optical system 1 to the screen 16. The imaging unit 12 includes an imaging optical system 2, an imaging element 3, and the imaging focus mechanism 22. The imaging optical system 2 images a region including the optical axis AX1 of the projection optical system 1 in the projection image 18 and forms an image of the region.

The imaging element 3 captures the image formed by the imaging optical system 2. The imaging element 3 is electrically connected to the processor 26. The imaging element 3 transmits a captured image that is an image of the captured image, to the processor 26. For example, a charge coupled device (CCD) or a complementary metal oxide semiconductor (CMOS) can be used as the imaging element 3.

The imaging optical system 2 includes a plurality of lenses arranged along an optical axis AX2 of the imaging optical system 2. FIG. 2 conceptually illustrates the plurality of lenses included in the imaging optical system 2. A part of the plurality of lenses included in the imaging optical system 2 functions as a focus group 2A that moves in the focus adjustment. The imaging focus mechanism 22 is electrically connected to the processor 26 and moves the focus group 2A along the optical axis AX2 based on the driving signal from the processor 26. Accordingly, the focus adjustment of the imaging optical system 2 is performed. For example, the imaging focus mechanism 22 is configured to include an actuator (not illustrated) such as a motor.

The lens shift mechanism 24 is electrically connected to the processor 26. The lens shift mechanism 24 moves the projection unit 11 relatively parallel to the display element 14 in a plane perpendicular to the optical axis AX1 based on the driving signal from the processor 26 (hereinafter, this operation will be referred to as a lens shift). Accordingly, the projection optical system 1 moves in a direction perpendicular to the optical axis AX1 relative to the display element 14. A position of the projection image 18 on the screen 16 can be changed by changing a relative position between the projection optical system 1 and the display element 14. FIG. 1 schematically illustrates a change in the position of the projection image 18 with arrows in an up-down direction and in a left-right direction. For example, the lens shift mechanism 24 is configured to include an actuator (not illustrated) such as a solenoid or a motor.

For example, the imaging unit 12 is fixedly arranged on an upper surface of the projection unit 11. Accordingly, in a case where the lens shift is performed, the imaging unit 12 also moves together with the projection unit 11 as a single body. Here, "moving as a single body" means moving by the same amount in the same direction at the same time.

The processor 26 performs the focus adjustment of the imaging optical system 2 in imaging of the imaging optical system 2. In addition, the processor 26 performs the focus adjustment on the region not including the optical axis AX1 in the projection image 18, based on information acquired from the imaging unit 12 in the imaging. The processor 26 of the present example performs the focus adjustment of the imaging optical system 2 using a contrast detection method. Specifically, the processor 26 acquires a contrast characteristic of the captured image by analyzing the captured image input from the imaging element 3 as needed while transmitting the driving signal to the imaging focus mechanism 22 to move the focus group 2A. The processor 26 sets a state where contrast is highest as an in-focus state of the imaging optical system 2, and acquires positional information of the focus group 2A in the in-focus state by causing the imaging optical system 2 to perform imaging in the in-focus state. The processor 26 derives the projection distance from the positional information of the focus group 2A and transmits the driving signal for performing the focus adjustment corresponding to the derived projection distance to the projection focus mechanism 21. The processor 26 controls the focus adjustment for the region not including the optical axis AX1 in the projection image 18 by moving the focus group 1A by a movement amount corresponding to the driving signal. For example, the processor 26 is a central processing unit (CPU) and controls each part including the projection focus mechanism 21, the imaging focus mechanism 22, and the lens shift mechanism 24 by executing a control program in cooperation with a memory (not illustrated).

The operating part 28 receives an operation input of a user. For example, the operating part 28 is configured to include an operation switch and a direction instruction key. For example, the operation switch is a power switch and a switch for adjustment. For example, the direction instruction key is used for designating a movement direction and a movement amount of the projection unit 11 in the lens shift. The operating part 28 may be provided in the body part 13 or may be provided as a remote control device separate from the body part 13. In a case where the user operates the operating part 28, an operation signal is input into the processor 26. The processor 26 controls each part based on the operation signal.

Next, a summary of autofocus in the projection apparatus 10 will be described. In recent years, there has been increasing demand for obtaining a large projection image 18 with a short projection distance. Thus, the projection optical system 1 comprised in the projection apparatus 10 is an optical system having a very wide angle of view. In addition, in the projection apparatus 10 having a lens shift function, the position of the projection image 18 is changeable on the screen 16. Thus, a region (hereinafter, referred to as a projectable region) to which the projection image 18 can be projected is very wide. Furthermore, in recent years, definition of the projection image 18 has been increased.

As a method of the autofocus, performing the autofocus by capturing the projection image 18 on the screen 16 is considered. However, in a case of performing the autofocus by imaging the entire projection image 18, the projection image 18, from the above circumstances, has to be captured at a high resolution in the entire projectable region that is a very wide range. Then, a size of the apparatus is increased, and a cost is also increased.

As another method of the autofocus, performing the autofocus based on distance measurement using laser light is considered. However, in this method, for example, a change in the position of the projection image 18 cannot be handled because an irradiation position of the laser light is limited, and the position of the projection image 18 on which the focus adjustment is to be performed does not coincide with the irradiation position of the laser light in a case where an obstacle is present ahead of the apparatus. For such reasons, this method is not suitable for wide range autofocus.

Therefore, in the present embodiment, by using the characteristic of the projection optical system 1 as an optical system having a very wide angle of view, the autofocus is performed by imaging only the region near the optical axis AX1 in the projection image 18 via the imaging unit 12. Generally, an optical system having a very wide angle of view, such as the projection optical system 1 of the present example, has a short focal length and thus, has a deep depth of field. Consequently, the region near the optical axis AX1 in the projection image 18 is in a state close to a deep focus state and, even in a case where the projection distance changes, maintains the in-focus state, that is, a state in focus. On the other hand, in a region far from the optical axis AX1 in the projection image 18, effects of field curvature and the like cannot be ignored. Thus, in a case where the projection distance changes, a state that deviates from the in-focus state, that is, a state out of focus, occurs. Thus, in a case of imaging only the region near the optical axis AX1 in the in-focus state in the projection image 18 via the imaging unit 12, deriving the projection distance based on information about the imaging, and performing the focus adjustment on the region far from the optical axis AX1 in the projection image 18 using the projection distance, the projection image 18 in which almost the entire projection image 18 is in the in-focus state can be obtained.

Figure 3:
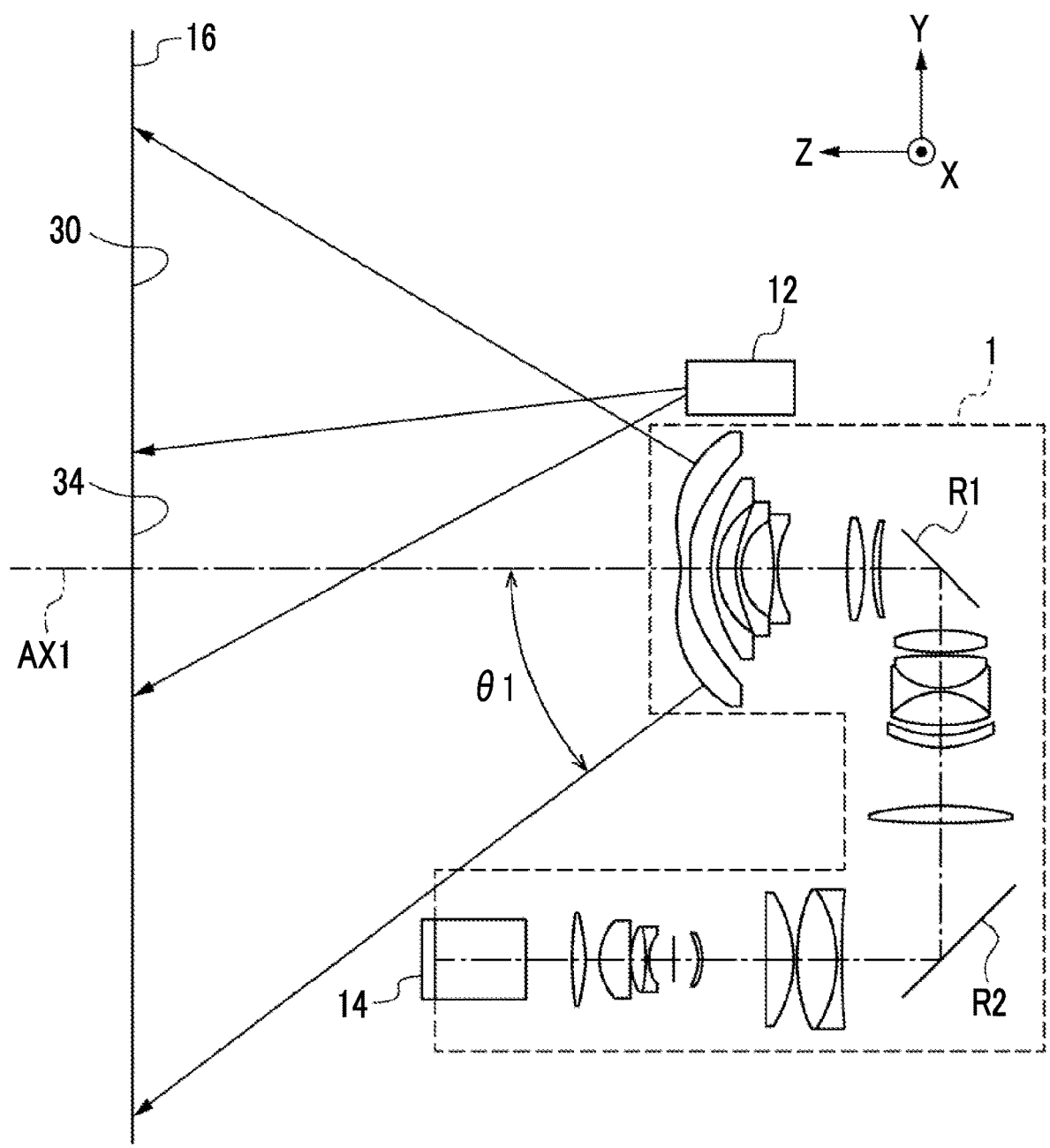
FIG. 3 is a diagram schematically illustrating a state where an imaging unit images a region near an optical axis.

FIG. 3 schematically illustrates a state where the imaging unit 12 images the region near the optical axis AX1. As illustrated in FIG. 3, the projection optical system 1 has a large maximum half angle of view θ1, and a projectable region 30 on the screen 16 also has a wide range. An imaging region 34 that is a region imaged by the imaging unit 12 is only a part of the projectable region 30 having a wide range. In FIG. 3, an optical system that includes a plurality of lenses and two mirrors R1 and R2 which deflect an optical path, and that forms an optical path having a winding shape is illustrated as an example of the projection optical system 1. The mirror R1 and the mirror R2 are an example of an optical path deflection member according to the embodiment of the disclosed technology. FIG. 3 is a schematic diagram, and the projectable region 30, the imaging region 34, and the maximum half angle of view θ1 are not drawn in accurate sizes.

In the following description, a direction of the optical axis AX1 of the projection optical system 1 will be referred to as a Z direction. A direction that is perpendicular to the Z direction and that is the up-down direction in FIG. 3 will be referred to as a Y direction. A direction perpendicular to both of the Z direction and the Y direction will be referred to as an X direction. In a case where the optical path of the projection optical system 1 has a winding shape as in the example in FIG. 3, the direction of the optical axis AX1 is a direction of an optical axis of an optical element closest to the screen 16 side on the optical path of the projection optical system 1. A plane of the screen 16 is an XY plane. In addition, in the following description, a screen side and a display element side on the optical path of the projection optical system 1 may be referred to as an enlargement side and a reduction side, respectively.

Figure 4:
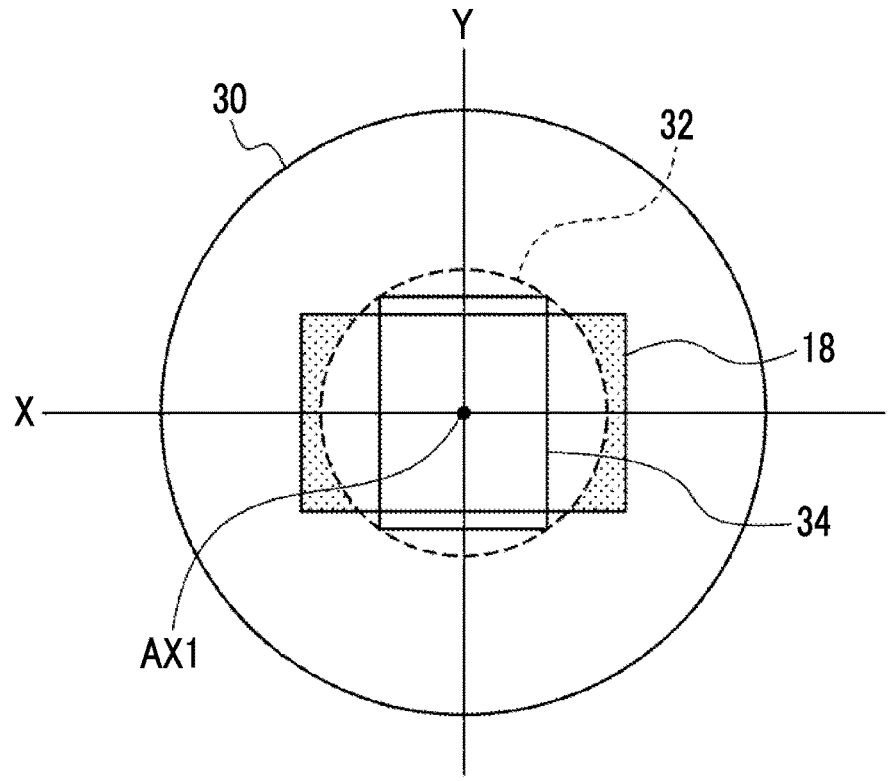
FIG. 4 is a diagram illustrating a projection image, an in-focus region, and an imaging region in a case where a center of the projection image is on the optical axis.

FIG. 4 illustrates examples of the projectable region 30, the projection image 18, an in-focus region 32, and the imaging region 34 on the screen 16. FIG. 4 illustrates an example of a case where a center of the projection image 18 is on the optical axis AX1. The optical axis AX1 corresponds to an intersection between an X axis and a Y axis in FIG. 4. The in-focus region 32 is a region that can be considered as maintaining the in-focus state even in a case where the projection distance changes. The in-focus region 32 is a circular region centered at the optical axis AX1. In the present example, the imaging region 34 is a rectangle inscribed in the in-focus region 32. In the example in FIG. 4, most of a region of the projection image 18 overlaps with the in-focus region 32, and a region (region with dotted hatching) of the projection image 18 that does not overlap with the in-focus region 32 is small.

Figure 5:
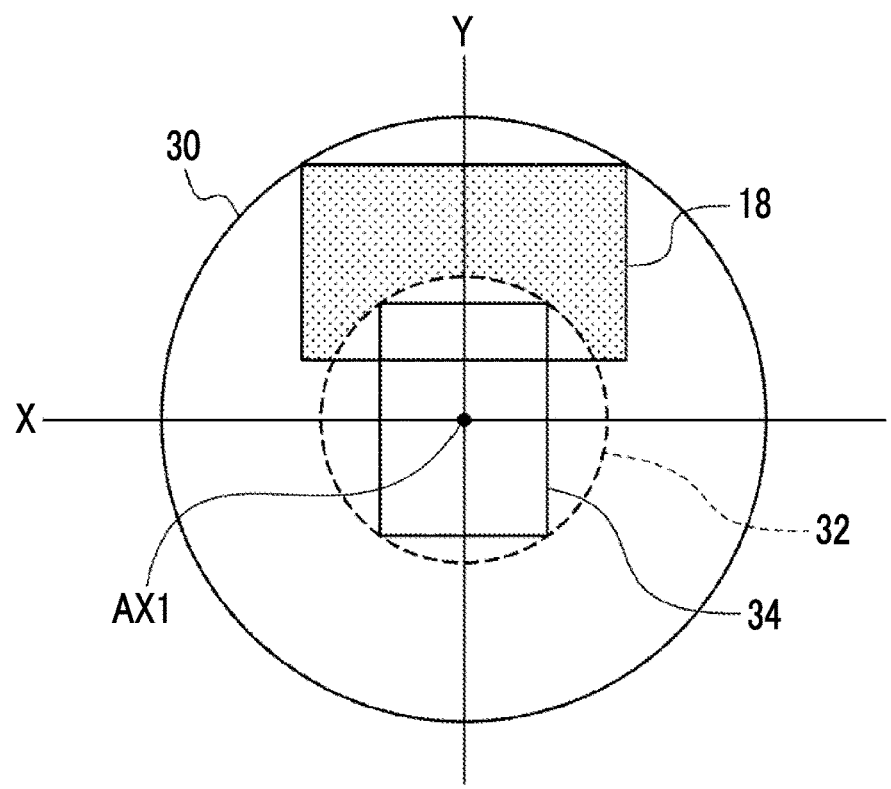
FIG. 5 is a diagram illustrating the projection image, the in-focus region, and the imaging region in a case where the projection image is separated upward from the optical axis.

Examples of the projectable region 30, the projection image 18, the in-focus region 32, and the imaging region 34 on the screen 16 in a case where the projection image 18 is moved upward by performing the lens shift from the state in FIG. 4 are illustrated in FIG. 5. In the example in FIG. 5, the region (region with dotted hatching) of the projection image 18 that does not overlap with the in-focus region 32 is large. Thus, in the example in FIG. 5, the focus adjustment is performed on a larger region of the projection image 18 than the example in FIG. 4.

While the region of the projection image 18 that does not overlap with the in-focus region 32 varies in area and in position between the example in FIG. 4 and the example in FIG. 5, the imaging region 34 is identical, and the imaging region 34 in both examples includes the region near the optical axis AX1. In the projection apparatus 10, even in a case where the projection image 18 is positioned at an arbitrary position in the projectable region 30, it is not necessary to image the entire projectable region 30, and only an inside of the in-focus region 32 near the optical axis AX1 may be imaged. Thus, a decrease in the size of the apparatus can be achieved.

More specifically, in a case where a longest diameter of a display region 14A in the display element 14 is H1, and a focal length of the projection optical system 1 is f1, the projection apparatus 10 is configured to satisfy Conditional Expression (1) below. By satisfying Conditional Expression (1), an optical system that has a very short focal length and thus, has a very deep depth of field is used as the projection optical system 1. In addition, it is easy to provide the projection optical system 1 with a very wide angle of view. By satisfying Conditional Expression (1), even in a case where the focus adjustment is performed on an edge part of the projectable region 30, the in-focus state of the region near the optical axis AX1 can be maintained.

$$2.2 < H1/|f1| \qquad (1)$$

Unlike the projection optical system 1 of the present example, in a case where the projection optical system 1 that has a relatively narrow angle of view and that has a relatively long focal length is used, performing the focus adjustment on the edge part of the projectable region 30 causes the region near the optical axis AX1 to be out of focus because the depth of field is relatively shallow.

It is preferable that the projection apparatus 10 further satisfies Conditional Expression (1-1) below. By satisfying Conditional Expression (1-1) not to be greater than or equal to an upper limit thereof, an advantage for suppressing an increase in size of the projection optical system 1 is achieved.

$$3 < H1/|f1| < 8 \qquad (1-1)$$

Furthermore, in a case where a longest diameter of an imaging region 3A in the imaging element 3 of the imaging unit 12 is H2, the maximum half angle of view of the projection optical system 1 is θ1, and a focal length of the imaging optical system 2 is f2, the projection apparatus 10 is configured to satisfy Conditional Expression (2) below. Here, θ1 is the projectable maximum half angle of view. Since H2/(f2×tan θ1) is an absolute value, 0<|H2/(f2×tan θ1)| is established. Conditional Expression (2) is an expression related to the imaging region 34 having a suitable size. By satisfying Conditional Expression (2) not to be greater than or equal to an upper limit thereof, an advantage for suppressing an increase in size of the imaging optical system 2 is achieved.

$$0 < |H2/(f2 \times \tan \theta 1)| < 1.2 \qquad (2)$$

In order to further suppress an increase in the size of the imaging optical system 2, it is preferable that the projection apparatus 10 further satisfies Conditional Expression (2-1) below.

$$0 < |H2/(f2 \times \tan \theta 1)| < 0.8 \qquad (2-1)$$

Figure 6:
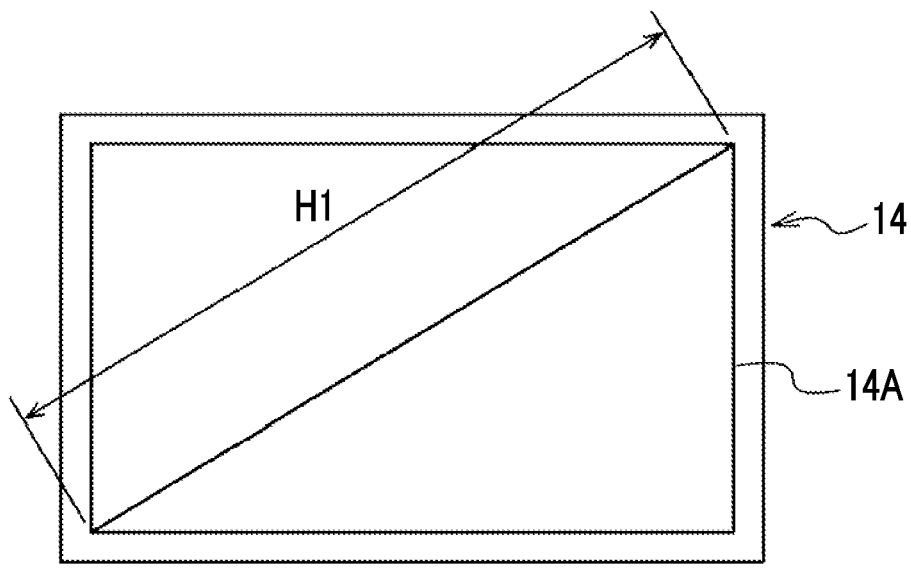
FIG. 6 is a diagram for describing H1.

The "longest diameter of the display region 14A in the display element 14" related to H1 means a value of twice a distance between the optical axis AX1 and a point farthest from the optical axis AX1 in a diameter direction in the display region 14A that coincides with the optical axis AX1 at a centroid thereof. As illustrated in FIG. 6 as an example, in a case where the display region 14A is a rectangle, a length of a diagonal line of the display region 14A is H1. In addition, for example, in a case where the display region 14A is a perfect circle, a diameter of the display region 14A is H1. In a case where the display region 14A is an ellipse, a major axis is H1.

In addition, the "display region 14A in the display element 14" means a region in which the image is actually displayed. For example, in a case where the display element 14 comprises a display part of an aspect ratio of 4:3 in which a plurality of pixels are arranged, and an image of an aspect ratio of 3:2 is displayed on a part of the display part, the display region 14A refers to a region in which the image of the aspect ratio of 3:2 is displayed. Accordingly, a diameter of the display element 14 does not necessarily coincide with the longest diameter of the display region 14A.

Figure 7:
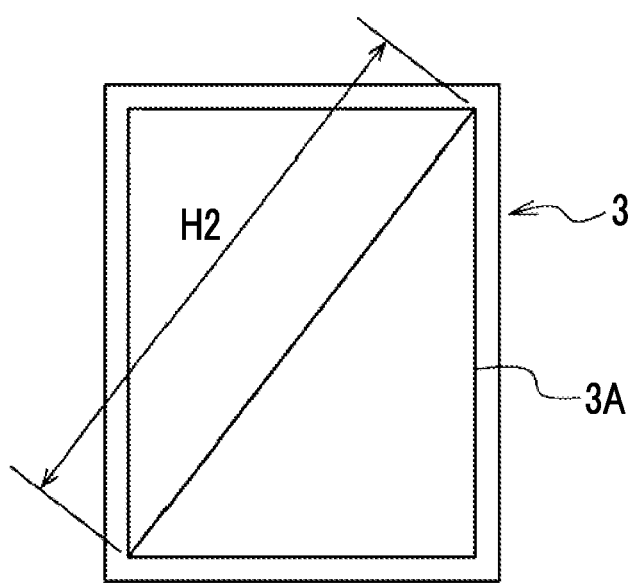
FIG. 7 is a diagram for describing H2.

The "longest diameter of the imaging region 3A in the imaging element 3" related to H2 means a value of twice a distance between the optical axis AX2 and a point farthest from the optical axis AX2 in the diameter direction in the imaging region 3A that coincides with the optical axis AX2 at a centroid thereof. As illustrated in FIG. 7 as an example, in a case where the imaging region 3A is a rectangle, a length of a diagonal line of the imaging region 3A is H2. In addition, for example, in a case where the imaging region 3A is a perfect circle, a diameter of the imaging region 3A is H2. In a case where the imaging region 3A is an ellipse, a major axis is H2.

Figure 8:
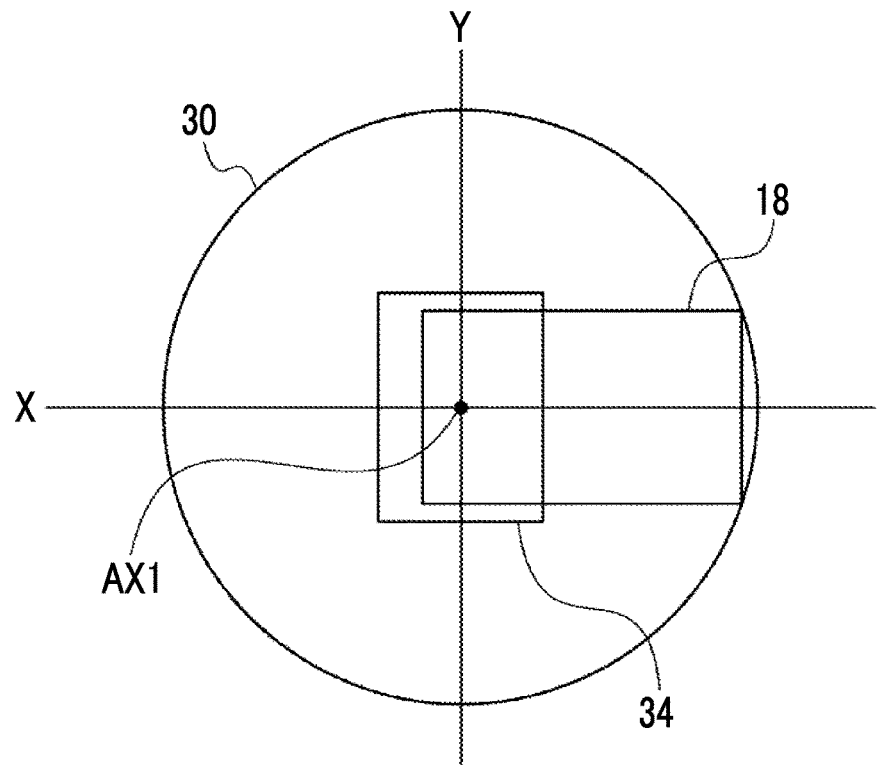
FIG. 8 is a diagram illustrating the projection image, the in-focus region, and the imaging region in a case where the projection image is separated rightward from the optical axis.

FIG. 8 illustrates examples of the projection image 18 and the imaging region 34 in a case where the projection image 18 is moved in a rightward direction by performing the lens shift from the state in FIG. 4. In the examples illustrated in FIG. 4, FIG. 5, and FIG. 8, since the display region 14A and the imaging region 3A have rectangular shapes, both of the projection image 18 and the imaging region 34 have rectangular shapes. In a case of such shapes, as illustrated in FIG. 4, FIG. 5, and FIG. 8, it is preferable to configure that a long side direction of the projection image 18 is parallel to a short side direction of the imaging region 34.

Figure 9:
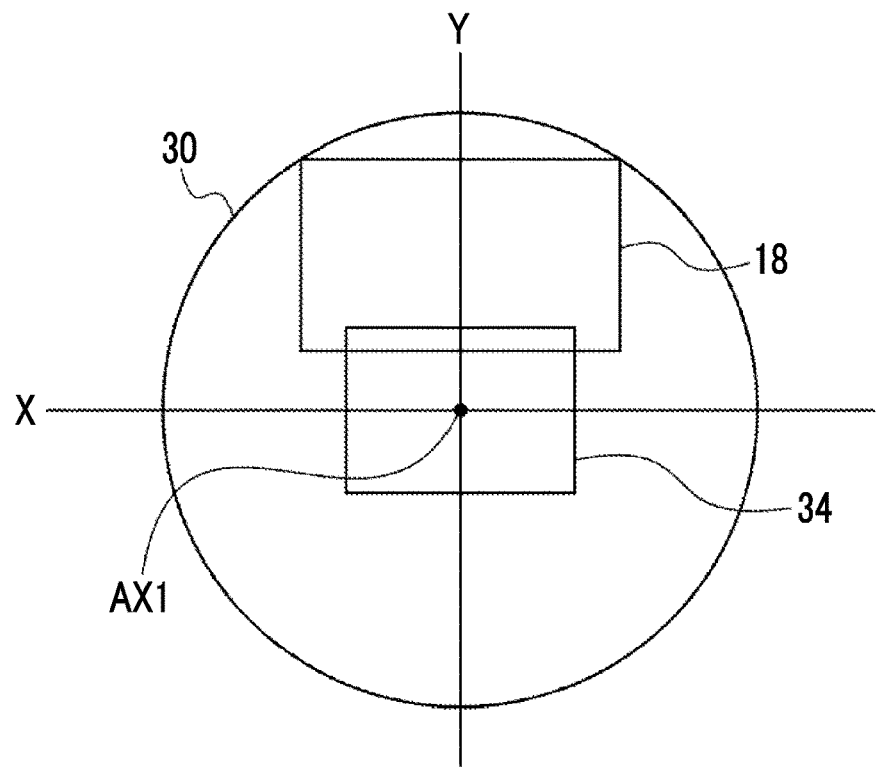
FIG. 9 is a diagram illustrating a state where a long side direction of the projection image is perpendicular to a short side direction of the imaging region.

An example in which the projection image 18 and the imaging region 34 have rectangular shapes, and in which the long side direction of the projection image 18 is perpendicular to the short side direction of the imaging region 34 is illustrated in FIG. 9 as a comparative example. In the examples in FIG. 5 and FIG. 8, it is easy to increase an area of an overlapping portion between the projection image 18 and the imaging region 34, compared to the example in FIG.

9. For this reason, in a case where the long side direction of the projection image 18 is parallel to the short side direction of the imaging region 34, it is easy to perform imaging using a smaller imaging region 34, compared to a case where the directions are perpendicular to each other. Consequently, an advantage for decreasing a size of the imaging element 3 and for decreasing a size of the imaging optical system 2 is achieved.

Figure 10:
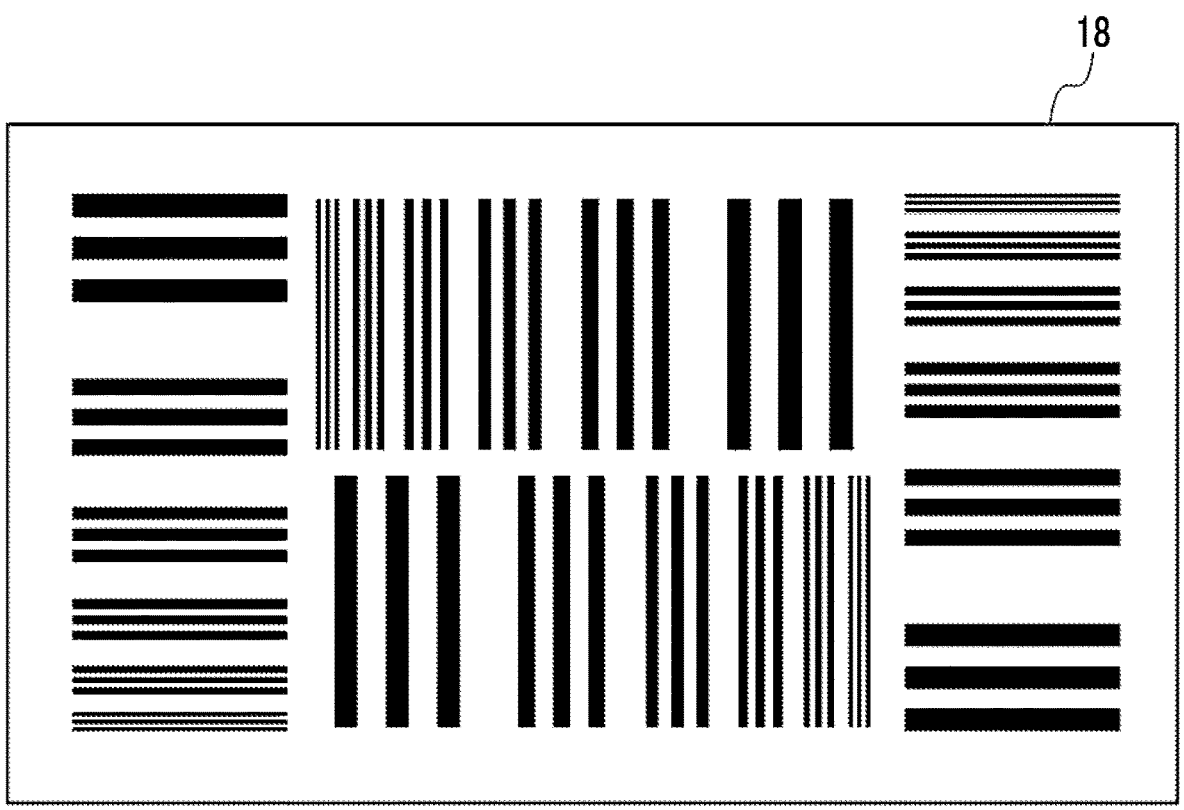
FIG. 10 is a diagram illustrating an example of a projection image for distance measurement.

An image for measuring the projection distance of the projection image 18 may be used as the projection image 18 projected in the imaging. For example, in the focus adjustment, a chart consisting of black and white geometric figures may be displayed on the display element 14. By using the image for distance measurement, the focus adjustment of the imaging optical system 2 can be more easily performed with higher accuracy, compared to a case of using an image of a scene, a person, or the like. A reason for this is as follows. FIG. 10 illustrates the projection image 18 consisting of black and white line patterns as an example of the image for distance measurement. As illustrated, the image for distance measurement is generally a monochrome binary image. Thus, an advantage for detecting the contrast is achieved, compared to an image of a scene, a person, or the like having a relatively large amount of gray scale tones.

Figure 11:
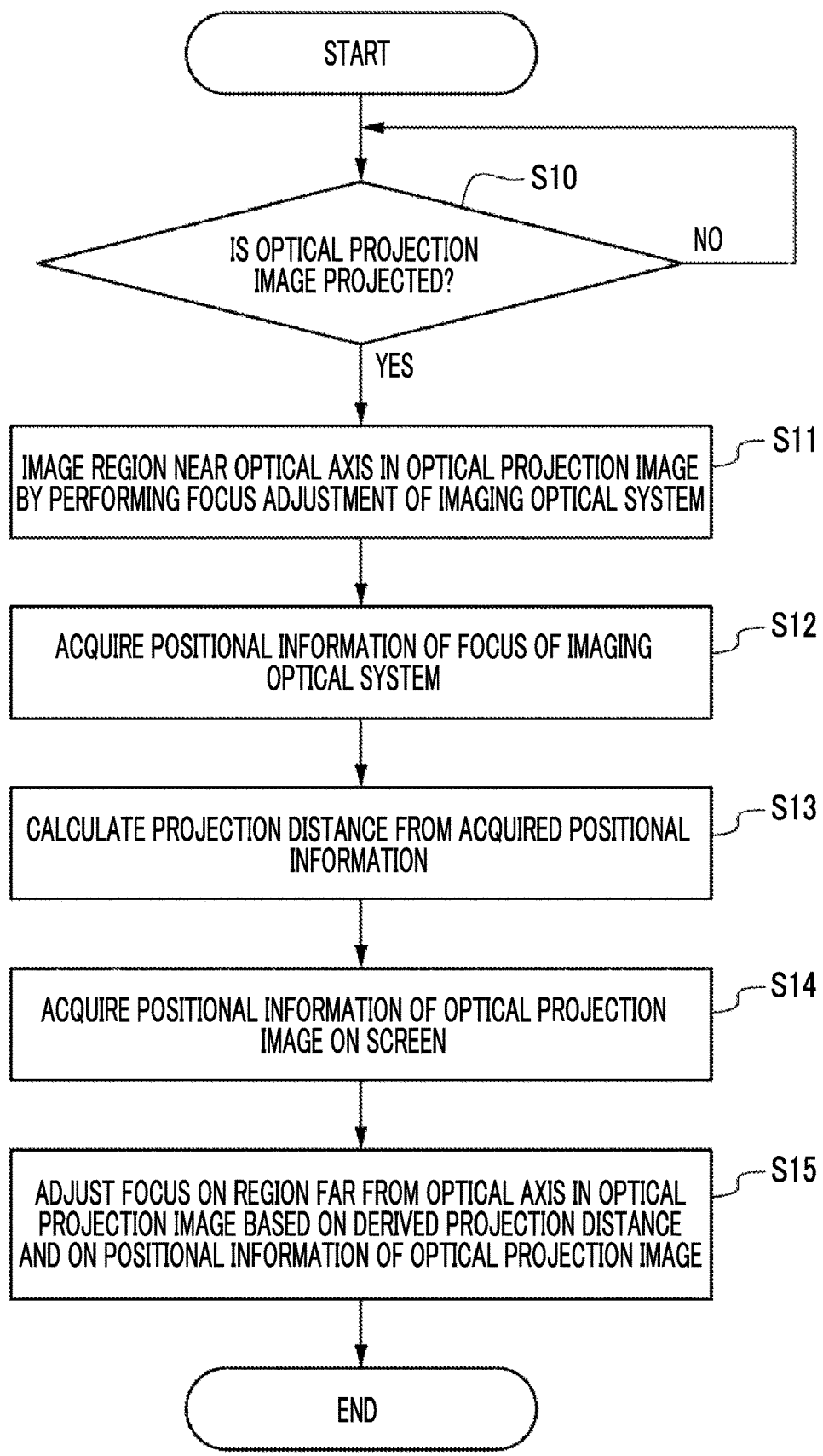
FIG. 11 is a flowchart for describing autofocus processing.

Next, processing of the autofocus will be described with reference to the flowchart illustrated in FIG. 11. First, the processor 26 monitors whether or not the projection image 18 is projected (step S10). While the projection image 18 is not projected (step S10: NO), the processor 26 continues monitoring.

In a case where it is determined that the projection image 18 is projected (step S10: YES), the processor 26 acquires the contrast characteristic of the captured image by analyzing the captured image input from the imaging element 3 as needed while transmitting the driving signal to the imaging focus mechanism 22 to move the focus group 2A. The processor 26 sets a state where the contrast is highest as the in-focus state of the imaging optical system 2, and causes the imaging optical system 2 to image the region near the optical axis AX1 of the projection image 18 in the in-focus state (step S11).

The processor 26 acquires the positional information of the focus of the imaging optical system 2 in the in-focus state (step S12). For example, the processor 26 counts driving pulses input into the actuator of the imaging focus mechanism 22 and detects a movement amount of the focus group 2A based on the counted number of driving pulses. In a case where the movement amount of the focus group 2A from a reference position can be detected, a position of the focus group 2A can be detected. Alternatively, in a case where the imaging focus mechanism 22 is configured to include a sensor (not illustrated) for detecting the movement amount of the focus group 2A, the processor 26 may detect the movement amount based on a signal output by the sensor. For example, a potentiometer and a linear encoder for detecting the movement amount of the projection optical system 1 from the reference position can be used as the sensor. In a case where an output value from the sensor is an analog value, the output value is subjected to analog to digital conversion (A/D conversion) and then, is input into the processor 26.

The processor 26 derives the projection distance from the acquired positional information (step S13). For example, a look-up table in which the position of the focus group 2A is associated with the projection distance is stored in the memory comprised in the processor 26. The processor 26 derives the projection distance by referring to the look-up table.

In addition, the processor 26 acquires positional information of the projection image 18 on the screen 16 (step S14). For example, the processor 26 counts driving pulses input into the actuator of the lens shift mechanism 24 and detects a movement amount of the projection unit 11 based on the counted number of driving pulses. In a case where the movement amount of the projection unit 11 from a reference position can be detected, a relative position between the display element 14 and the projection unit 11 can be detected, and the positional information of the projection image 18 can be acquired. Alternatively, in a case where the lens shift mechanism 24 is configured to include a sensor (not illustrated) for detecting the movement amount of the projection unit 11, the processor 26 may detect the movement amount based on a signal output by the sensor. For example, a potentiometer and a linear encoder for detecting the movement amount of the projection unit 11 from the reference position can be used as the sensor. In a case where an output value from the sensor is an analog value, the output value is subjected to analog to digital conversion (A/D conversion) and then, is input into the processor 26. Examples of the positional information of the projection image 18 include coordinates of a center point of the projection image 18 and coordinates of a point (hereinafter, referred to as the farthest point) that is farthest from the optical axis AX1 in the projection image 18, in the XY plane.

The processor 26 adjusts focus on the region far from the optical axis AX1 in the projection image 18 based on the projection distance derived in step S13 and on the positional information of the projection image 18 acquired in step S14 (step S15), and ends the processing. For example, a look-up table in which the projection distance, coordinates of each point of the projection image 18 in the XY plane, and a position of the focus group 1A are associated with each other is stored in the memory comprised in the processor 26. In the look-up table, the position of the focus group 1A at which each point of the projection image 18 is in the in-focus state is recorded for each combination of the projection distance and the coordinates of each point. The processor 26 derives the position of the focus group 1A by referring to the look-up table. Which point of the projection image 18 is to be used to derive the position of the focus group 1A may be set in advance. For example, the farthest point may be used, or a point at 80 percent of a distance from the optical axis AX1 to the farthest point in the diameter direction from the optical axis AX1 may be used. The processor 26 transmits the driving signal to the projection focus mechanism 21 to move the focus group 1A to the derived position. The projection focus mechanism 21 moves the focus group 1A based on the driving signal.

According to the present embodiment, since only the region near the optical axis AX1 may be imaged, the apparatus can be configured to have a small size at a low cost, compared to a method of performing the autofocus by imaging the entire projectable region. In addition, according to the present embodiment, the autofocus can be performed for an accurate position of the projection image 18 in a wide range, compared to a method of performing the autofocus based on distance measurement using laser light.

In the processing, various types of processing can be added. Hereinafter, examples of the processing that can be added will be described.

[Processing of Determining Leveling of Projection Image]

Processing of determining leveling of the projection image 18 may be added between step S10 and step S11. For example, the projection optical system 1 projects a specific chart for leveling determination such as a lattice chart, and the processor 26 detects line distortion from the captured image obtained by imaging the projection image 18 of the chart via the imaging optical system 2. For example, the processor 26 detects the number of distorted locations and/or a distortion amount and compares a detection value with a predetermined threshold value. In a case where the detection value does not exceed the threshold value, the processor 26 proceeds to the processing in step S11. In a case where the detection value exceeds the threshold value, the processor 26 divides the imaging region 34 into a plurality of areas, detects the number of distorted locations and/or the distortion amount for each area, and compares the detection value with the predetermined threshold value. The processor 26 extracts only an area in which the detection value does not exceed the threshold value, and performs the processing in step S11 using only the area. In a case where there is no area in which the detection value does not exceed the threshold value, the processor 26 determines that the leveling of the projection image 18 is low, and displays an error message indicating that automatic autofocus is not available, on a display part (not illustrated).

[Processing 1 of Switching Charts]

A plurality of specific charts having different resolutions may be prepared, and processing of switching charts in accordance with a value of the contrast may be added in step S11. For example, the processor 26 compares a predetermined threshold value of the contrast with the acquired value of the contrast. In a case where the acquired value of the contrast exceeds the threshold value, the processor 26 performs the processing in step S11. In a case where the acquired value of the contrast is less than or equal to the threshold value, the processor 26 selects a chart having a lower resolution than the projected chart from the plurality of prepared charts, projects the selected chart through the projection unit 11, and performs the processing in step S11. In a case where the value of the contrast is less than or equal to the threshold value for all of the plurality of prepared charts, the processor 26 may detect a boundary between the projection image 18 and the screen 16 and use the boundary instead of the chart.

[Processing 2 of Switching Charts]

A plurality of types of charts having different colors may be prepared, and the processor 26 may cause the projection optical system 1 to project a chart having a suitable color in accordance with a color of the screen 16 in step S10.

[Processing of Increasing Accuracy of Focus Adjustment]

In step S11, in a case of acquiring the contrast characteristic, a state where the contrast is highest may be obtained by increasing an amplitude of the movement of the focus group 2A of the imaging optical system 2, and then, a state where the contrast is highest may be detected and acquired again with high accuracy by decreasing the amplitude of the movement of the focus group 2A. Since the projection image 18 during the autofocus operation is a still image rather than a motion image, the above method can be employed for increasing accuracy. This is effective in a case where increasing accuracy is prioritized over increasing a speed of the autofocus.

[Processing 1 of Performing Focus Adjustment by Dividing Imaging Region into Areas]

In step S1, the imaging region 34 may be divided into a plurality of areas, and an average value may be obtained and used from a calculation result of the contrast and the like of each area.

[Processing 2 of Performing Focus Adjustment by Dividing Imaging Region into Areas]

In step S11, the imaging region 34 may be divided into a plurality of areas, the value of the contrast may be calculated for each area, and only an area in which the value exceeds a predetermined threshold value may be employed. That is, data of an area having an abnormal value less than or equal to the threshold value may be excluded.

[Processing 3 of Performing Focus Adjustment by Dividing Imaging Region into Areas]

In step S11, the imaging region 34 may be divided into a plurality of areas, and only a part of the areas may be used in accordance with a relative position between the projection image 18 and the imaging region 34. This method can shorten a time required for the autofocus, compared to a method of using the entire imaging region 34. For example, in a case where the center of the projection image 18 is on the optical axis AX1 as in the example in FIG. 4, only an area at the center of the imaging region 34 may be used. In addition, as in the example in FIG. 5, in a case where only an area in an edge part of the imaging region 34 overlaps with the projection image 18, only the area in the edge part of the imaging region 34 may be used. By not using an area of the imaging region 34 that does not overlap with the projection image 18, it is possible to contribute to an increase in the accuracy of the focus adjustment.

[Processing of Executing Different Autofocus Modes Depending on Lens Shift Amount]

In a case where an amount of displacement in the center of the projection image 18 with respect to the optical axis AX1 is referred to as a lens shift amount, the autofocus may be performed in different modes depending on the lens shift amount. For example, in step S11, in a case where the lens shift amount is less than or equal to a predetermined threshold value, it is considered that the overlapping portion between the projection image 18 and the imaging region 34 is large, and the focus adjustment of the imaging optical system 2 is performed only once. In a case where the lens shift amount exceeds the predetermined threshold value, the overlapping portion between the projection image 18 and the imaging region 34 is small, and thus, a noise ratio with respect to a signal is increased. Thus, the focus adjustment of the imaging optical system 2 is performed a plurality of times. In addition, in a case where the lens shift amount exceeds the predetermined threshold value as a limit, the processor 26 performs the focus adjustment of the imaging optical system 2 by driving the lens shift mechanism 24 to set the lens shift amount to be less than or equal to the predetermined threshold value as a limit and then, restores the original lens shift amount by driving the lens shift mechanism 24. In this case, information corresponding to the original lens shift amount is used as the positional information of the projection image 18 in step S14. Alternatively, in a case where the lens shift amount exceeds the predetermined threshold value as a limit, the processor 26 may display an instruction message for reducing the lens shift amount or an error message indicating that automatic autofocus is not available, on the display part (not illustrated).

[Processing of Setting Optical State of Imaging Optical System in Accordance with Imaging Condition]

In step S11, an optical state of the imaging optical system 2 may be appropriately set in accordance with an imaging condition. For example, imaging may be performed with appropriate exposure by appropriately setting an F number and/or a shutter speed of the imaging optical system 2 in accordance with illuminance of the projection image 18 and/or intensity of extraneous light. In addition, an appropriate imaging resolution and an imaging range may be obtained by changing a zooming state in accordance with the projection image 18 using a zooming optical system as the imaging optical system 2. Specifically, for example, in a case where the projection image 18 has a high resolution, the imaging optical system 2 may be set to a telephoto state. In a case where the lens shift amount is large, the imaging optical system 2 may be set to a wide angle state.

In addition, various modifications can be made to the configuration of the projection apparatus. For example, the projection optical system 1 may be configured such that the focus adjustment can be performed on the entire region of the projection image 18. In this case, a movable part in the focus adjustment of the entire region of the projection image 18 is configured to be different from the movable part (focus group 1A in the above example) in the focus adjustment of the region not including the optical axis AX1. According to this configuration, the focus adjustment of the entire projection image 18 can be more favorably performed.

Figure 12:
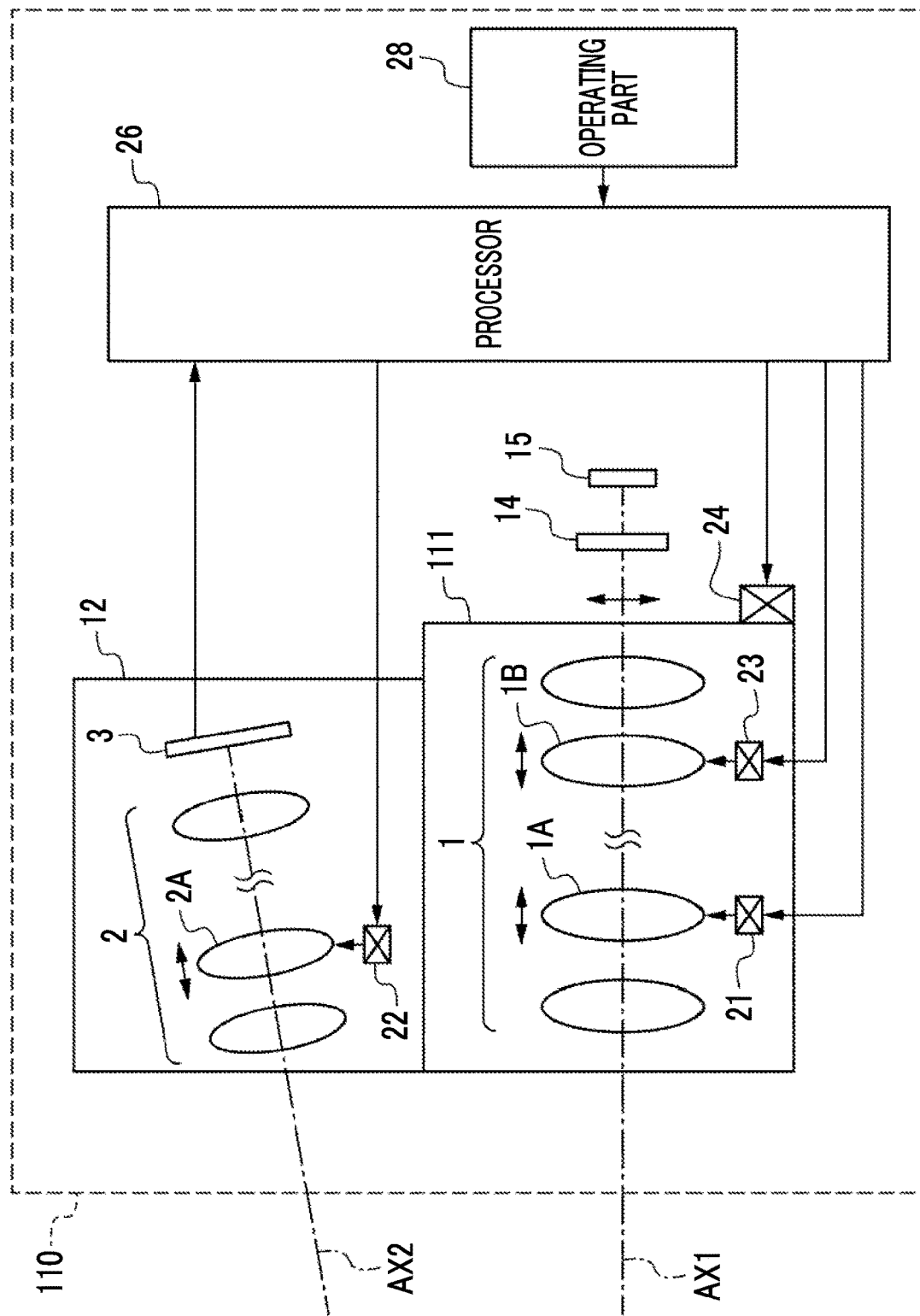
FIG. 12 is a schematic configuration diagram of a projection apparatus of a modification example.

An example of this configuration is illustrated in FIG. 12 as a modification example. A projection apparatus 110 illustrated in FIG. 12 is different from the projection apparatus 10 in FIG. 2 in that the projection unit 11 is substituted with a projection unit 111. The projection unit 111 in FIG. 12 is different from the projection unit 11 in FIG. 2 in that the projection unit 111 comprises a projection focus mechanism 23, and that a part of the lenses of the projection optical system 1 functions as a focus group 1B.

The focus group 1B is a lens group different from the focus group 1A and is arranged closer to the reduction side than the focus group 1A. The projection focus mechanism 23 is electrically connected to the processor 26. The projection focus mechanism 23 moves the focus group 1B along the optical axis AX1 of the projection optical system 1 based on the driving signal from the processor 26. Accordingly, the focus adjustment can be performed on the entire region of the projection image 18. For example, the projection focus mechanism 23 is configured to include an actuator (not illustrated) such as a motor.

In addition, as another example of performing the focus adjustment on the entire region of the projection image 18, the entire projection optical system 1 may be formed as a movable part, and the movable part may be moved with respect to the display element 14. In a case where the projection optical system 1 is configured to be interchangeable, variation in interval between a mount of the projection optical system 1 and the display element 14 can be adjusted by forming the entire projection optical system 1 as a movable part.

Figure 13:
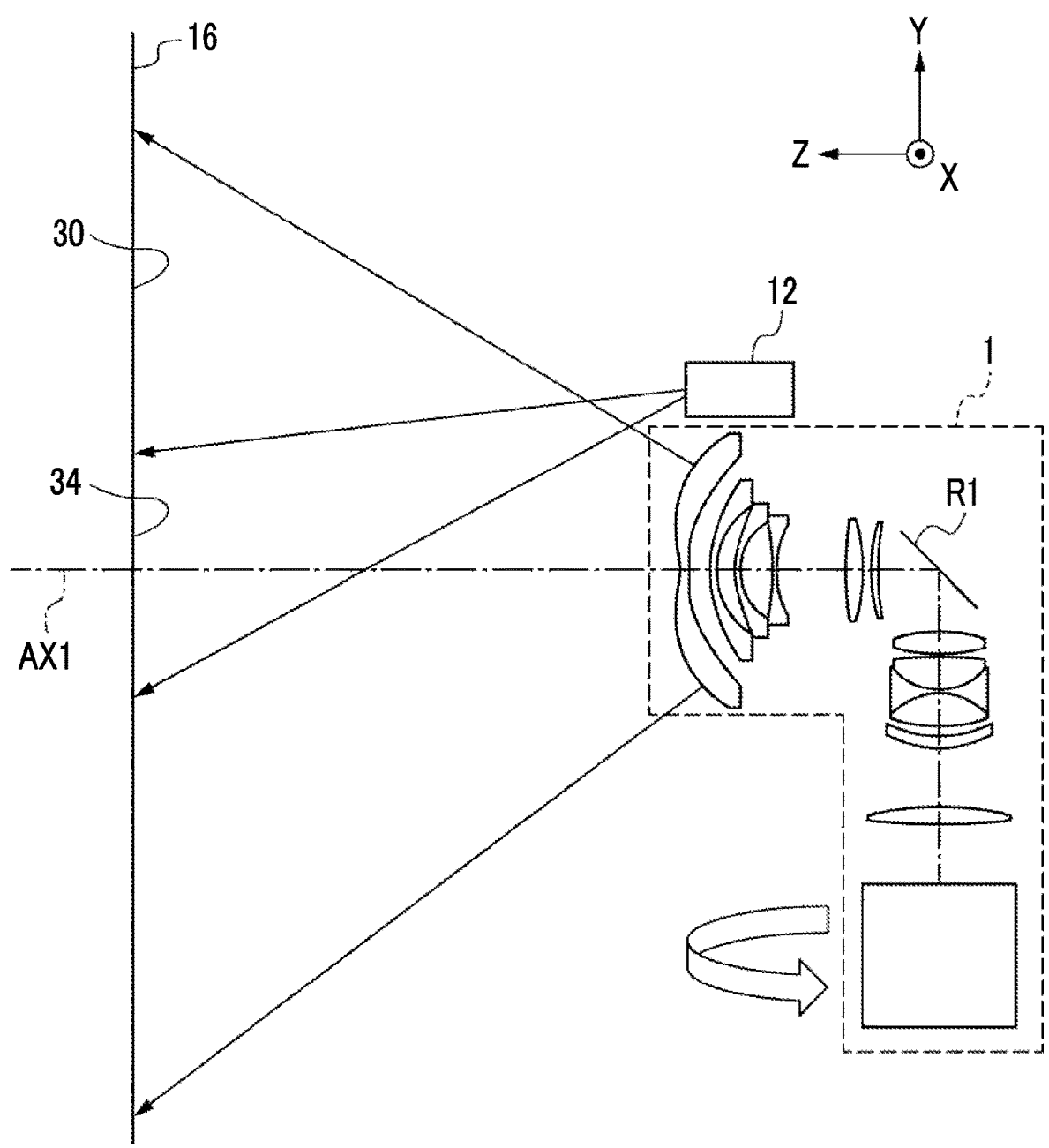
FIG. 13 is a diagram for describing rotation of a projection optical system.

In addition, as illustrated in FIG. 13, the projection optical system 1 may include at least one optical path deflection member that deflects an optical path, and a part of the projection optical system 1 may be configured to be rotatable about the optical axis of the projection optical system 1. FIG. 13 is a diagram illustrating a state where the mirror R2 of the projection optical system 1 in FIG. 3 and an optical element closer to the reduction side than the mirror R2 are rotated by 90 degrees about the Y axis. In FIG. 13, the mirror R2 and the optical element closer to the reduction side than the mirror R2 are schematically illustrated as a rectangle. By including the optical path deflection member, the projection optical system 1 is configured to have an optical path having a winding shape and to partially rotate easily. By making a part of the projection optical system 1 rotatable, a projection direction can be changed without changing a direction of the body part 13. Thus, usefulness can be increased.

As described above, in a case where the projection optical system 1 includes the optical path deflection member, and a part of the projection optical system 1 is configured to be rotatable about the optical axis of the projection optical system 1, it is preferable that the imaging unit 12 is arranged closer to the enlargement side than the optical path deflection member that is closest to the enlargement side. With such a configuration, the imaging unit 12 is easily positioned at all times in a part of the projection optical system 1 on the enlargement side even in a case where a part of the projection optical system 1 is rotated. In addition, the region near the optical axis AX1 on the screen 16 can be easily imaged at all times.

Figure 14:
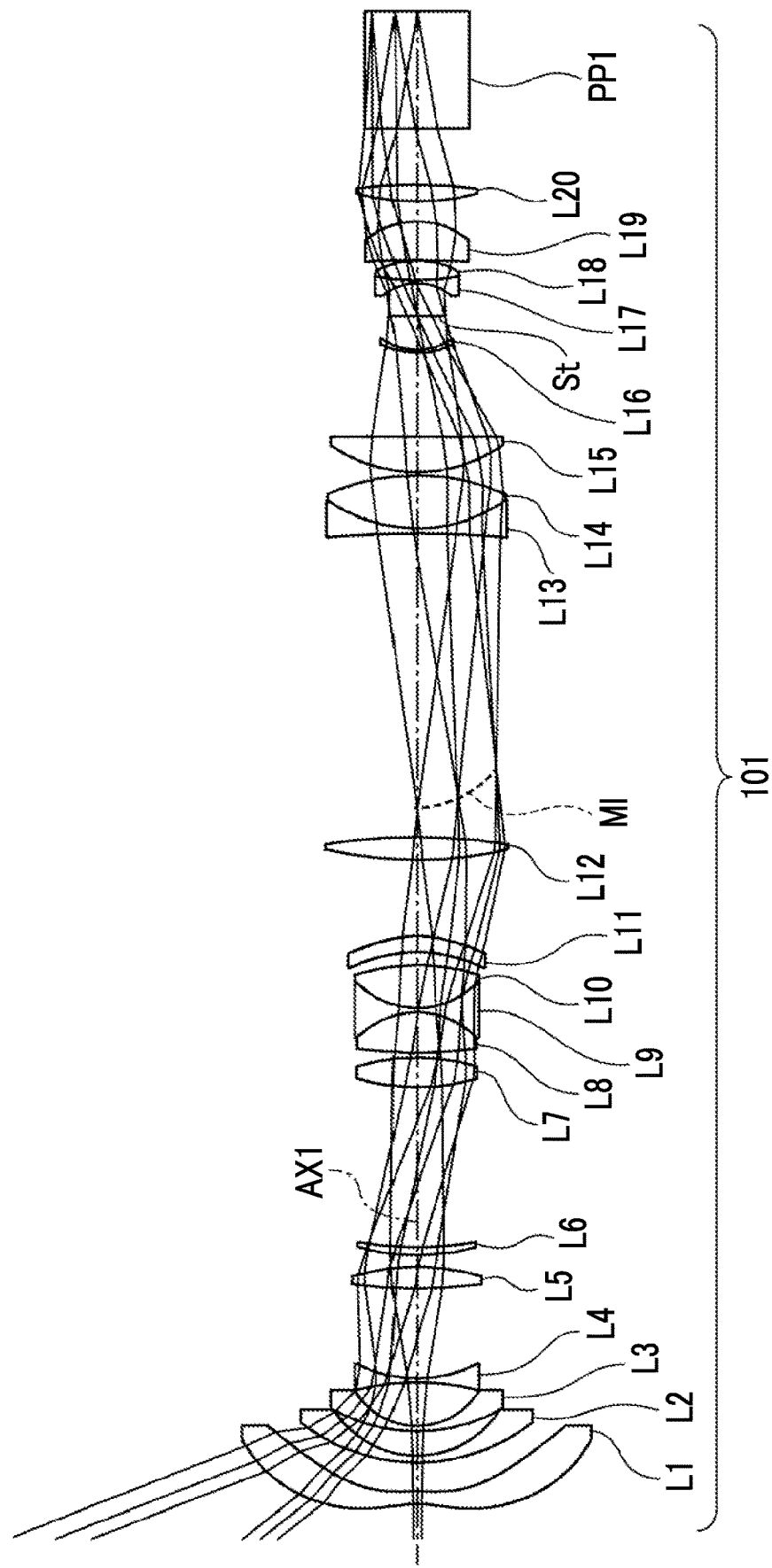
FIG. 14 is a diagram illustrating a cross section configuration of a projection optical system of one example.

Next, examples of a projection optical system and an imaging optical system according to the embodiment of the disclosed technology will be described. FIG. 14 illustrates a cross section configuration diagram of one example of the projection optical system according to the embodiment of the disclosed technology. In FIG. 14, rays with an angle of view of 0, with an intermediate angle of view, and with the maximum angle of view are illustrated together. A projection optical system 101 in FIG. 14 is formed to have a straight linear optical path by removing the mirror R1 and the mirror R2 from the projection optical system 1 in FIG. 3. The projection optical system 101 comprises lenses L1 to L16, an aperture stop St, lenses L17 to L20, and an optical member PP1 in this order from the enlargement side to the reduction side along the optical axis AX1. The aperture stop St illustrated in FIG. 14 indicates a position in the direction of the optical axis AX1 rather than a size and a shape. The optical member PP1 is a member that does not have refractive power and that is assumed to be a prism or the like. The optical member PP1 is not an essential constituent. In the present example, a position of a surface of the optical member PP1 on the reduction side coincides with a position of an image display surface of the display element 14 in the direction of the optical axis AX1. An intermediate image MI is formed inside the projection optical system 101.

Table 1 shows basic lens data, Table 2 shows specifications, and Table 3 shows aspherical coefficients as numerical value data of the projection optical system 101. In each table shown below, numerical values rounded to predetermined digits are disclosed. The numerical value data of the projection optical system 101 shown below is normalized such that an absolute value of the focal length of the projection optical system 101 is 1.00. An optical system can exhibit the same performance even in a case where the optical system is proportionally enlarged or proportionally reduced.

In Table 1, screen is written in a surface number field of a surface corresponding to the screen 16. In Table 1, surface number fields show surface numbers in a case where the numbers are increased by one at a time toward the reduction side from a surface of a lens closest to the enlargement side as a first surface. Curvature radius fields show a curvature radius of each surface. Surface spacing fields show surface spacing between each surface and a surface adjacent thereto on the reduction side on the optical axis AX1. Nd fields show a refractive index of each constituent with respect to a d line, and vd fields show an Abbe number of each constituent based on the d line.

In Table 1, a sign of a curvature radius of a surface of a shape having a convex surface toward the enlargement side is positive, and a sign of a curvature radius of a surface of a shape having a convex surface toward the reduction side is negative. Table 1 also shows the optical member PP1 together. In Table 1, in the surface number fields of surfaces corresponding to a paraxial image forming position of the intermediate image MI and to the aperture stop St, phrases (intermediate image) and (stop), respectively, are disclosed together with the surface numbers.

Table 2 shows an absolute value |f1| of the focal length, a back focus Bf as an air conversion distance, an F number FNo, a full angle of view 2ω, and H1. In the present example, a value of the longest diameter H1 of the display region 14A of the display element 14 is a value of twice the maximum image height of the projection optical system 1 on the reduction side. In the full angle of view fields, [°] means that a unit is degree. The values shown in Table 2 are values based on the d line.

In Table 1, surface numbers of aspherical surfaces are marked with *, and numerical values of paraxial curvature radiuses are disclosed in the curvature radius fields of the aspherical surfaces. In Table 3, the surface number fields show the surface numbers of the aspherical surfaces, and KA and Am (m=3, 4, 5, . . . , 20) fields show numerical values of aspherical coefficients for each aspherical surface. In the numerical values of the aspherical coefficients in Table 3, "E±n" (n: integer) means "×10$^{\pm n}$". KA and Am are aspherical coefficients in an aspheric equation represented by the following expression.

$$Zd = C \times h^2 / \{1 + (1 - KA \times C^2 \times h^2)^{1/2}\} + \Sigma Am \times h^m$$

where

Zd: depth of aspherical surface (length of vertical line drawn from point on aspherical surface at height h down to plane that is tangential to aspherical surface apex and that is perpendicular to optical axis)

h: height (distance from optical axis to lens surface)

C: reciprocal of paraxial curvature radius

KA, Am: aspherical coefficient

In the aspheric equation, E means a total sum related to m.

TABLE 1

Basic Lens Data of Projection Optical System

| Surface Number | Curvature Radius | Surface Spacing | Nd | vd |
|---|---|---|---|---|
| screen | ∞ | 193.41 | | |
| *1 | −5.226 | 0.74 | 1.53158 | 55.1 |
| *2 | −14.483 | 1.67 | | |

TABLE 1-continued

Basic Lens Data of Projection Optical System

| Surface Number | Curvature Radius | Surface Spacing | Nd | vd |
|---|---|---|---|---|
| 3 | 10.974 | 0.39 | 1.83481 | 42.7 |
| 4 | 5.687 | 1.43 | | |
| 5 | 10.055 | 0.30 | 1.91082 | 35.3 |
| 6 | 4.228 | 2.51 | | |
| 7 | −15.278 | 0.23 | 1.72916 | 54.7 |
| 8 | 7.674 | 5.23 | | |
| 9 | 28.299 | 1.24 | 1.80610 | 33.3 |
| 10 | −13.124 | 0.64 | | |
| 11 | 12.658 | 0.47 | 1.84666 | 23.8 |
| 12 | 19.874 | 9.22 | | |
| 13 | 12.014 | 1.72 | 1.49700 | 81.6 |
| 14 | −12.014 | 0.25 | | |
| 15 | 24.861 | 2.35 | 1.67790 | 55.3 |
| 16 | −4.892 | 0.23 | 1.80518 | 25.5 |
| 17 | 4.892 | 2.49 | 1.49700 | 81.6 |
| 18 | −12.051 | 0.75 | | |
| *19 | −7.151 | 0.94 | 1.51007 | 56.2 |
| *20 | −5.350 | 4.41 | | |
| 21 | 22.906 | 1.33 | 1.84666 | 23.8 |
| 22 | −34.775 | 1.72 | | |
| 23 (Intermediate Image) | | 15.83 | | |
| 24 | −64.712 | 0.33 | 1.80610 | 33.3 |
| 25 | 9.242 | 3.04 | 1.63854 | 55.4 |
| 26 | −12.612 | 0.17 | | |
| 27 | 8.776 | 2.05 | 1.69680 | 55.5 |
| 28 | ∞ | 4.79 | | |
| 29 | 4.673 | 0.17 | 1.59270 | 35.3 |
| 30 | 3.403 | 1.98 | | |
| 31 (Stop) | ∞ | 1.89 | | |
| 32 | −3.034 | 0.17 | 1.80518 | 25.5 |
| 33 | 12.611 | 1.11 | 1.59282 | 68.6 |
| 34 | −4.838 | 0.03 | | |
| 35 | −57.476 | 2.24 | 1.49700 | 81.6 |
| 36 | −4.717 | 1.15 | | |
| 37 | 13.843 | 0.96 | 1.92286 | 20.9 |
| 38 | −27.294 | 3.29 | | |
| 39 | ∞ | 6.78 | 1.51633 | 64.1 |
| 40 | ∞ | | | |

TABLE 2

Specifications of Projection Optical System

| | |
|---|---|
| |f1| | 1.00 |
| Bf | 7.76 |
| FNo. | 1.91 |
| 2ω [°] | 138.4 |
| H1 | 3.29 |

TABLE 3

Aspherical Coefficients of Projection Optical System

| Surface Number | 1 | 2 | 19 | 20 |
|---|---|---|---|---|
| KA | −1.5463783E+00 | −6.9382468E+01 | −4.2607564E−01 | 5.9238030E−01 |
| A3 | 2.0188634E−02 | 3.1358694E−02 | −5.0945452E−03 | −4.0495354E−03 |
| A4 | 3.0478107E−03 | −2.9896469E−02 | 1.3118560E−02 | 1.2059833E−02 |
| A5 | −1.6698075E−03 | 3.6772078E−02 | −5.6112173E−03 | −3.7102380E−03 |
| A6 | 1.1542942E−04 | −2.9908896E−02 | −1.6330754E−03 | −6.4465878E−04 |
| A7 | 3.2492229E−05 | 1.6669831E−02 | 2.4342264E−03 | 9.7058579E−04 |
| A8 | −4.2531025E−06 | −6.6275160E−03 | −3.4232296E−04 | −1.0367408E−04 |
| A9 | −4.4240382E−07 | 1.9146829E−03 | −4.5272672E−04 | −1.4810355E−04 |
| A10 | 8.2458321E−08 | −4.0534017E−04 | 1.5449186E−04 | 3.7964877E−05 |
| A11 | 4.2880382E−09 | 6.2888677E−05 | 3.7074546E−05 | 1.1398645E−05 |
| A12 | −1.0095171E−09 | −7.0778056E−06 | −2.3378235E−05 | −5.1141232E−06 |
| A13 | −3.9289100E−11 | 5.6299446E−07 | −2.0299221E−07 | −1.5338201E−07 |
| A14 | 9.1888923E−12 | −2.9976192E−08 | 1.7281377E−06 | 3.2746925E−07 |
| A15 | 2.8547071E−13 | 9.4894364E−10 | −1.7564081E−07 | −3.3290055E−08 |

TABLE 3-continued

Aspherical Coefficients of Projection Optical System

| Surface Number | 1 | 2 | 19 | 20 |
|---|---|---|---|---|
| A16 | −6.0738874E−14 | −1.2862398E−11 | −5.9700627E−08 | −8.9049879E−09 |
| A17 | −1.0586871E−15 | 1.5165433E−14 | 1.1131941E−08 | 1.9880145E−09 |
| A18 | 2.3574437E−16 | −4.6702764E−15 | 5.4474267E−10 | 1.7067502E−11 |
| A19 | 1.1161198E−18 | −3.1901302E−17 | −2.1807038E−10 | −3.4337789E−11 |
| A20 | −3.6582153E−19 | 1.0423640E−17 | 1.0424670E−11 | 2.3614055E−12 |

Figure 15:
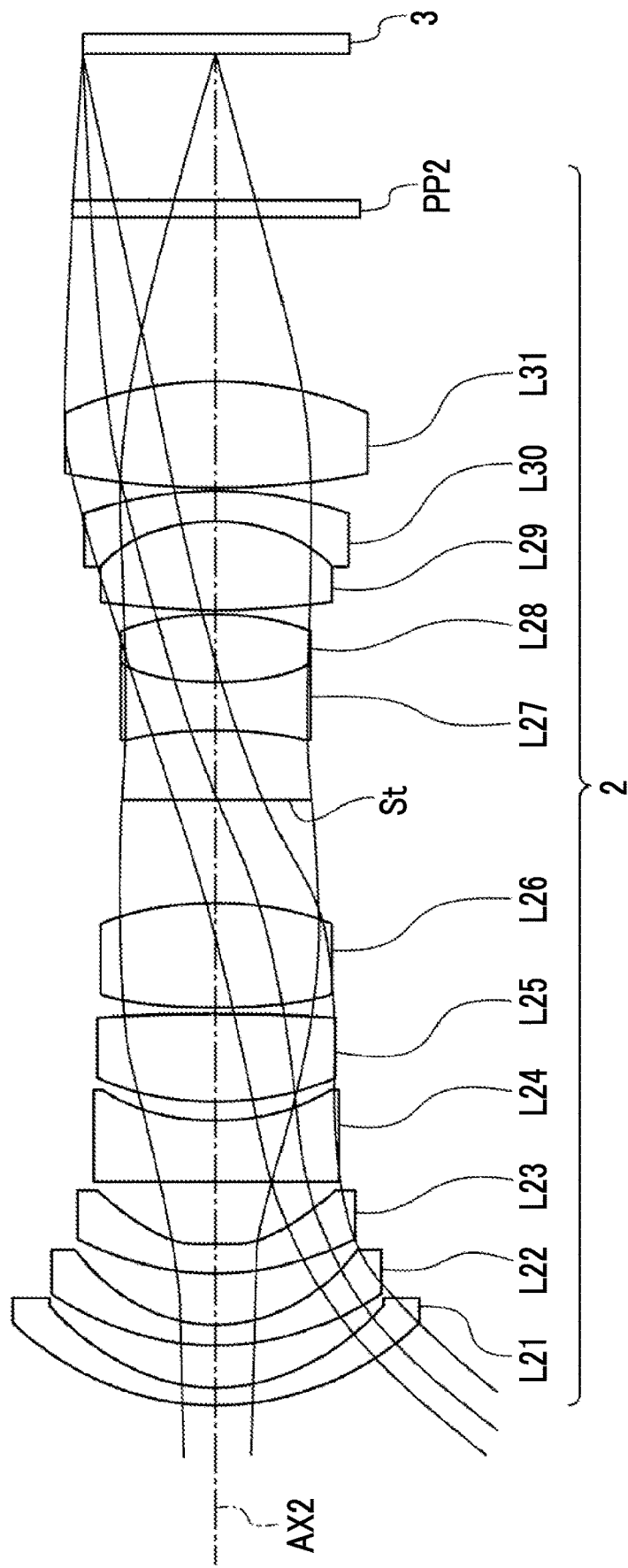
FIG. 15 is a diagram illustrating a cross section configuration of an imaging optical system of one example.

FIG. 15 illustrates a cross section configuration diagram of one example of the imaging optical system according to the embodiment of the disclosed technology. In FIG. 15, rays with an angle of view of 0 and with the maximum angle of view are illustrated together. In addition, the imaging element 3 is also illustrated. The imaging optical system 2 in FIG. 15 comprises lenses L21 to L26, the aperture stop St, lenses L27 to L31, and an optical member PP2 in this order from the enlargement side to the reduction side along the optical axis AX2. The aperture stop St illustrated in FIG. 15 indicates a position in the direction of the optical axis AX2 rather than a size and a shape. The optical member PP2 is a member that does not have refractive power and that is assumed to be a filter, a cover glass, or the like. The optical member PP2 is not an essential constituent.

Table 4 shows basic lens data, Table 5 shows specifications, and Table 6 shows aspherical coefficients as numerical value data of the imaging optical system 2 in FIG. 15. A display method of Table 4 to Table 6 is basically the same as that of Table 1 to Table 3. Thus, duplicate description will be partially omitted.

In Table 4, a phrase (stop) is disclosed in the surface number field of the surface corresponding to the aperture stop St together with the surface number. Table 5 shows the focal length f2, the back focus Bf as an air conversion distance, the F number FNo, the full angle of view 2ω, and H2. In the present example, a value of the longest diameter H2 of the imaging region 3A of the imaging element 3 is a value of twice the maximum image height of the imaging optical system 2. The values shown in Table 5 are values based on the d line.

TABLE 4

Basic Lens Data of Imaging Optical System

| Surface Number | Curvature Radius | Surface Spacing | Nd | vd |
|---|---|---|---|---|
| screen | ∞ | 193.41 | | |
| 1 | 3.254 | 0.17 | 1.95375 | 32.3 |
| 2 | 2.261 | 0.46 | | |
| 3 | 3.219 | 0.21 | 1.91083 | 35.3 |
| 4 | 1.842 | 0.55 | | |
| *5 | 4.864 | 0.27 | 1.58135 | 59.4 |
| *6 | 1.609 | 0.69 | | |
| 7 | ∞ | 0.62 | 1.48749 | 70.4 |
| 8 | 2.354 | 0.24 | | |
| 9 | 3.731 | 0.91 | 1.60342 | 38.0 |
| 10 | −19.501 | 0.03 | | |
| 11 | 4.881 | 1.13 | 1.62005 | 36.4 |
| 12 | −3.763 | 1.10 | | |
| 13 (Stop) | ∞ | 0.69 | | |
| 14 | −7.201 | 0.51 | 1.95375 | 32.3 |
| 15 | 2.844 | 0.74 | 1.53775 | 74.7 |
| 16 | −2.844 | 0.03 | | |
| 17 | 10.538 | 0.92 | 1.53775 | 74.7 |
| 18 | −1.984 | 0.32 | 1.91083 | 35.3 |
| 19 | −4.095 | 0.03 | | |
| 20 | 8.543 | 1.14 | 1.48749 | 70.4 |
| 21 | −3.805 | 1.71 | | |
| 22 | ∞ | 0.17 | 1.5168 | 64.2 |
| 23 | ∞ | | | |

TABLE 5

Specifications of Imaging Optical System

| f2 | 1.42 |
| Bf | 1.49 |
| FNo. | 1.86 |
| 2ω [°] | 99.2 |
| H2 | 2.91 |

TABLE 6

Aspherical Coefficients of Imaging Optical System

| Surface Number | 5 | 6 |
|---|---|---|
| KA | 1.0000000E+00 | 1.0000000E+00 |
| A3 | −4.1122927E−17 | 7.8133561E−16 |
| A4 | 1.8552331E−01 | 2.2184976E−01 |
| A5 | −3.1067278E−01 | −4.8495901E−01 |
| A6 | 4.0347351E−01 | 5.7507169E−01 |
| A7 | −2.2465502E−01 | −8.9170876E−02 |
| A8 | −2.9229050E−01 | −5.8340606E−01 |
| A9 | 4.2544849E−01 | 2.1751768E−01 |
| A10 | 7.9157097E−02 | 4.7938719E−01 |
| A11 | −3.7589140E−01 | −2.3986054E−01 |
| A12 | 7.5064048E−02 | −2.2644574E−01 |
| A13 | 1.7764984E−01 | 1.2283037E−01 |
| A14 | −7.0498683E−02 | 6.6409872E−02 |
| A15 | −4.6612856E−02 | −3.3505133E−02 |
| A16 | 2.4442851E−02 | −1.2804657E−02 |
| A17 | 6.3978380E−03 | 4.7107390E−03 |
| A18 | −3.9704749E−03 | 1.6102872E−03 |
| A19 | −3.5837484E−04 | −2.6910045E−04 |
| A20 | 2.5111309E−04 | −1.0055470E−04 |

Table 7 shows corresponding values of Conditional Expressions (1) and (2) of the examples. The examples satisfy Conditional Expressions (1) and (2).

TABLE 7

| Conditional Expression (1) | H1/|f1| | 3.29 |
| Conditional Expression (2) | |H2/(f2 × tan θ1)| | 0.78 |

The projection optical system and the imaging optical system are not limited to the above examples, and various modifications can be made thereto. A curvature radius, surface spacing, a refractive index, an Abbe number, an aspherical coefficient, and the like of each optical element such as a lens included in the optical systems are not limited to the values shown in each numerical value example and may have other values. In addition, for an optical system having a winding optical path, the number of times the optical path is deflected and a deflection direction can be arbitrarily selected within a possible range. A focus group is not limited to a configuration consisting of a plurality of optical elements and may be configured to consist of one optical element.

While an example in which the relative position between the entire projection optical system and the display element 14 is set to be variable has been illustratively described in the description of the lens shift in the embodiment, a relative position between a part of the projection optical system and the display element 14 may be set to be variable. That is, the position of the projection image 18 may be changeable by changing the relative position between at least a part of the projection optical system and the display element 14. In addition, while an example in which the relative position between the display element 14 and the projection optical system is set to be variable by moving the projection optical system with respect to the display element 14 has been described in the description of the lens shift in the embodiment, the relative position between the display element 14 and the projection optical system may be set to be variable by moving the display element 14 with respect to the projection optical system.

While the processor 26 that performs the focus adjustment of the imaging optical system 2 is provided outside the imaging unit 12 in the above example, the processor 26 that performs the focus adjustment of the imaging optical system 2 may be provided inside the imaging unit 12. In addition, while the focus adjustment of the imaging optical system 2 uses the contrast detection method in the above example, an image plane phase difference method or a phase difference detection method may be used.

A transmissive display element in which a liquid crystal display (LCD) is used may be used as the display element 14 instead of the DMD. In addition, a self-emitting element such as a light emitting diode (LED) or an organic light emitting diode (OLED) may be used instead of the DMD.

While an example of using a lamp as a light source has been described in the embodiment, the disclosed technology is not limited thereto, and an LED or a laser light source may be used.

In the embodiment, the following various processors 26 can be used as the processor 26. The various processors 26 include a CPU that is a general-purpose processor 26 functioning by executing software (program), and a processor 26 such as a field programmable gate array (FPGA) of which a circuit configuration can be changed after manufacture. Examples of the FPGA include a dedicated electric circuit that is a processor 26 having a circuit configuration dedicatedly designed to execute specific processing, such as a programmable logic device (PLD) or an application specific integrated circuit (ASIC). The processor 26 may be composed of one of the various processors 26 or may be composed of a combination of two or more processors 26 of the same type or different types (for example, a combination of a plurality of FPGAs or a combination of a CPU and an FPGA). More specifically, an electric circuit in which circuit elements such as semiconductor elements are combined can be used as a hardware structure of the various processors 26.

In the disclosed technology, the embodiment and various modifications can be combined with each other as long as no contradiction arises thereby. In addition, the disclosed technology is not limited to the embodiment and can employ various configurations without departing from the gist thereof.

The above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, of course, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and to facilitate understanding of the parts according to the embodiment of the disclosed technology.

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. A projection apparatus comprising:
    a display element that displays an image;
    a projection optical system that forms a projection image by projecting the image;
    an imaging unit that includes an imaging optical system which images a first region including an optical axis of the projection optical system in the projection image, and an imaging element which captures an image formed by the imaging optical system; and
    a processor that controls focus adjustment on a second region not including the optical axis in the projection image based on information acquired from the imaging unit,
    wherein a position of the projection image is changeable by changing a relative position between at least a part of the projection optical system and the display element, and
    in a case where a longest diameter of a display region in the display element is H1, a focal length of the projection optical system is f1, a longest diameter of an imaging region in the imaging element is H2, a maximum half angle of view of the projection optical system is $\theta1$, and a focal length of the imaging optical system is f2, Conditional Expressions (1) and (2) are satisfied, which are represented by $$2.2 < H1/|f1| \tag{1}$$

$$0 < |H2/(f2 \times \tan \theta1)| < 1.2 \tag{2}.$$

2. The projection apparatus according to claim 1,
    wherein both of the projection image and the first region have rectangular shapes, and
    a long side direction of the projection image is parallel to a short side direction of the first region.

3. The projection apparatus according to claim 1,
    wherein the projection image is an image for measuring a projection distance of the projection image.

4. The projection apparatus according to claim 1,
wherein in the projection optical system, the focus adjustment is possible on a third region that is an entire projection image, and
a movable part in the focus adjustment of the second region is different from a movable part in the focus adjustment of the third region.

5. The projection apparatus according to claim 1,
wherein the projection optical system includes at least one optical path deflection member that deflects an optical path,
a part of the projection optical system is rotatable about the optical axis of the projection optical system, and
the imaging unit is arranged closer to an enlargement side than the optical path deflection member that is closest to the enlargement side.

6. The projection apparatus according to claim 1,
wherein Conditional Expression (1-1) is satisfied, which is represented by $$3 < H1/|f1| < 8 \tag{1-1}$$

7. The projection apparatus according to claim 1,
wherein Conditional Expression (2-1) is satisfied, which is represented by $$0 < |H2/(f2 \times \tan \theta 1)| < 0.8 \tag{2-1}$$

* * * * *